Figure 1A:
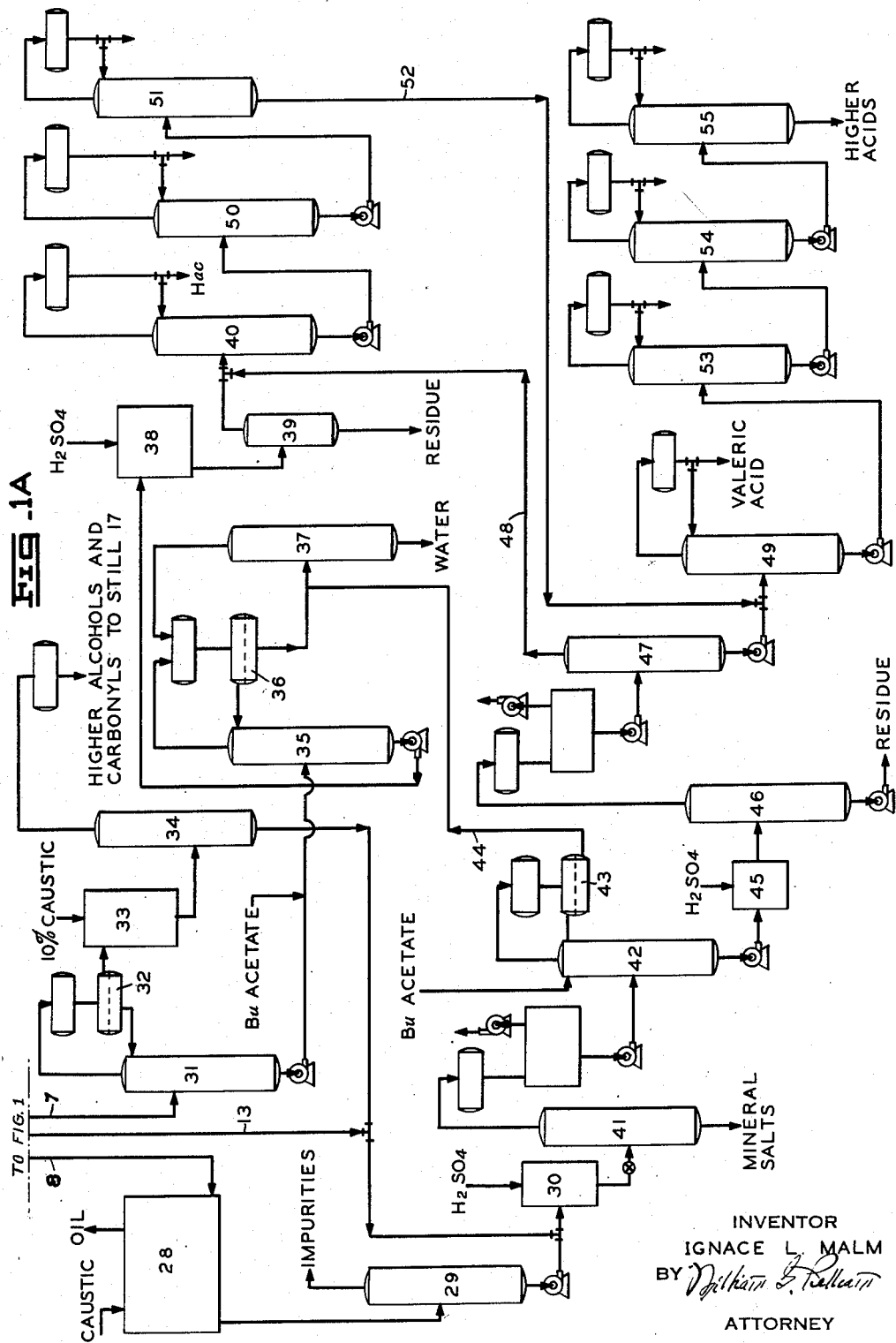

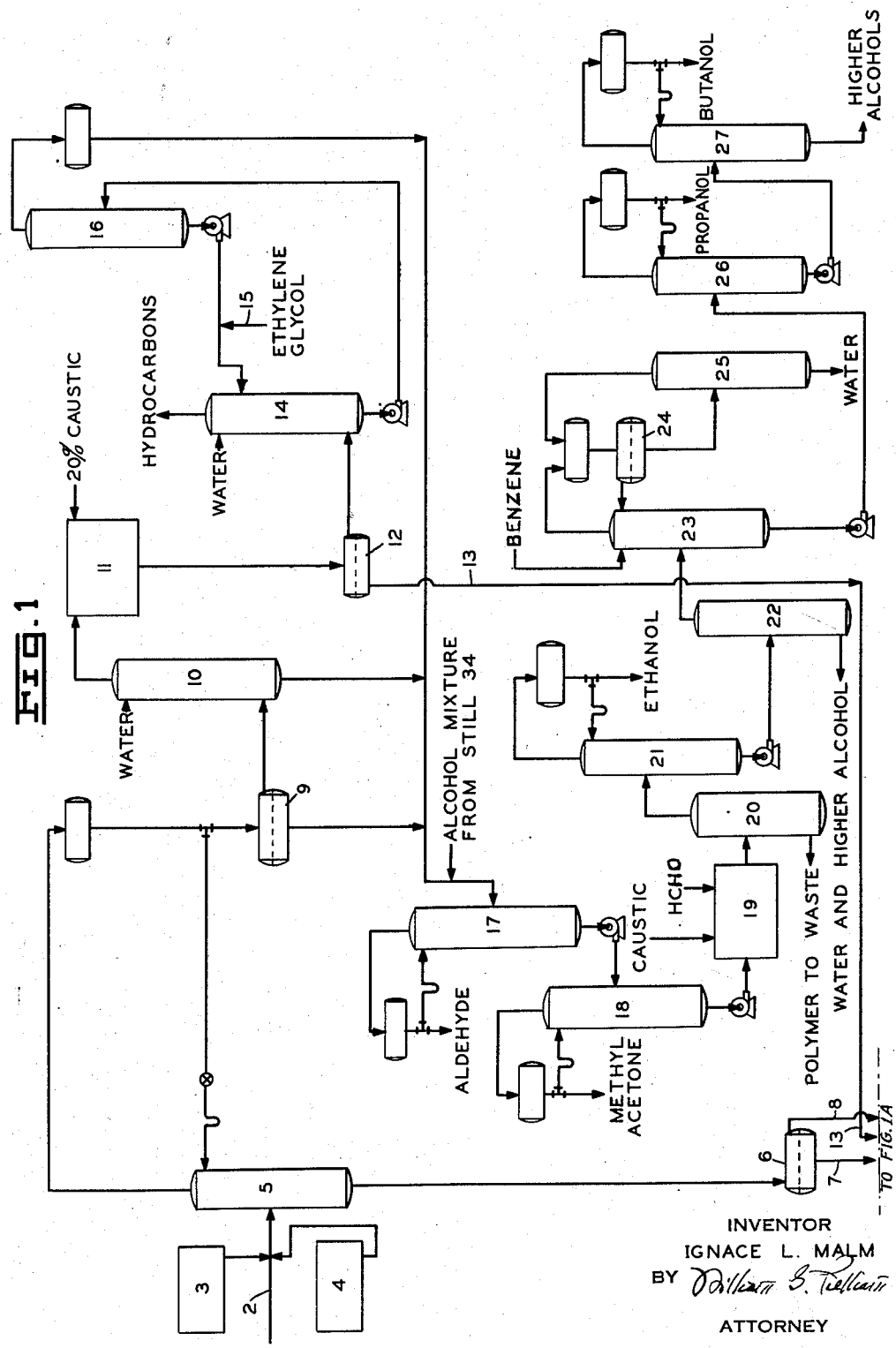

April 15, 1952      I. L. MALM      2,593,159

PROCESSING OF SYNTHETIC HYDROCARBONS

Filed March 9, 1948      2 SHEETS—SHEET 2

INVENTOR
IGNACE L. MALM
BY
ATTORNEY

Patented Apr. 15, 1952

2,593,159

UNITED STATES PATENT OFFICE 2,593,159

PROCESSING OF SYNTHETIC HYDROCARBONS

Ignace L. Malm, Tallant, Okla., assignor to Cities Service Oil Company, Bartlesville, Okla., a corporation of Delaware Application March 9, 1948, Serial No. 13,924

4 Claims. (Cl. 260—450)

This invention relates to improvements in the processing of the products synthesized by processes of the type of the Fischer-Tropsch, Synthol or "Synthine." More particularly my process relates to the separation of the various chemical compounds produced by such synthetic processes.

In the Fischer-Tropsch synthesis the materials produced by the reactions carried out comprise both hydrocarbons and oxygenated compounds such as alcohols, acids, aldehydes and ketones. The reaction products as they come from the process usually include considerable water so that an aqueous solution of oxygenated chemicals is obtained. While the oily and aqueous products have been processed separately for the recovery of various chemical constituents, I find that there is considerable advantage to processing the hydrocarbon fraction to a certain point along with the aqueous product containing water soluble chemicals. However, at an early stage in my process, I preferably separate out the hydrocarbon materials in two process streams and thereafter combine the recovery and refining of the various oxidized hydrocarbon compounds in a process which I find greatly reduces the loss of alcohols and acids due to esterification.

An important feature of my invention therefore involves the substantially separate processing of the alcohols and acids except for particular combined operations as pointed out hereinafter.

The primary object of my invention is to provide an improved process for the handling of synthetically produced chemicals, such as those obtained by the Fischer-Tropsch process.

Another object of my invention is to provide an improved process in which loss of alcohols and acids due to esterification is substantially avoided.

The details of my process are set out hereinafter in connection with the accompanying drawings which form a part of this application.

In the drawings:

Figures 1 and 1a taken together comprise a diagrammatic view partly in elevation showing an assembly of apparatus elements constructed and arranged in a flow sheet form suitable for carrying out my improved process.

In accordance with the features of my invention, the mixture of oily and aqueous products direct from the Synthol process is introduced into the apparatus through a line 2, or a corresponding mixture taken from the Synthol oil supply 3 and the Synthol aqueous product supply 4 may be conducted into the line 2, and thereby into a fractionating tower 5 of the apparatus. The products taken from the supplies 3 and 4 are advantageously mixed in approximately the proportions in which they are formed in the process. The fractionation carried out in tower 5 is preferably conducted at a top temperature of from 80° C. up to about 95° C. In most cases the higher temperature will be employed and the reflux ratio maintained so that substantially all of the alcohols are taken overhead while substantially all of the acids are retained in the tower 5 and withdrawn as a bottoms product into a separator 6. This bottoms product comprises hydrocarbon and aqueous fractions each containing dissolved oxygenated chemicals which are separated in the separator 6. These fractions are respectively withdrawn through lines 8 and 7 and processed along with some of the overhead products in accordance with the procedure described hereinafter in connection with the portion of the apparatus shown in Figure 1a.

The vapor mixture taken overhead from the tower 5 is condensed in a condenser, as indicated, and passed into a separator 9 in which hydrocarbon material is separated from the aqueous product containing primarily dissolved alcohols and aldehydes and esters. A portion of the overhead condensate is refluxed to the tower 5 to control the fractionation.

The hydrocarbon fraction separated out in the separator 9 is passed into extractor 10 wherein the water soluble constituents are washed from the hydrocarbon fraction with water. The hydrocarbon fraction is removed continuously from the extractor 10 into a caustic treater 11, and therein agitated with 20 per cent caustic solution for the hydrolysis of esters and removal of impurities and oxygenated hydrocarbons, including organic acids, not removed in the extractor 10. The acids are converted to salts. The combined materials in the treater 11 are conducted into a separator 12 for the separation of the caustic washings from the hydrocarbon fraction. The caustic washings are withdrawn through a line 13 and subjected to further processing with some of the bottoms products withdrawn from the separator 6 into the portion of the apparatus shown in Figure 1a.

The hydrocarbon fraction withdrawn from the separator 12 is conducted into an ethylene glycol extractor 14 in which the hydrocarbons are substantially freed of organic oxygen containing compounds, such as alcohols, aldehydes and ketones. The extraction effected in the extractor 14 is carried out with ethylene glycol introduced through a line 15 and water introduced at the top of the extractor. The glycol enters below the water entry to permit a short section of water wash to remove glycol from the oily raffinate. The hydrocarbons are withdrawn as a product from the top of the extractor 14, as indicated. The ethylene glycol extract is removed from the bottom of the extractor 14 and conducted into an extract stripper still 16 which removes overhead the extracted organic compounds and water, while the ethylene glycol is removed from the bottom of the stripper and recirculated to the top of the extractor 14, as indicated.

The aqueous stream containing the organic compounds removed overhead from the still 16 is condensed and mixed with the water washings from the extractor 10 and the separated aqueous layer from the separator 9. This mixture is conducted into a fractionating tower 17 which is used as an aldehyde still. The low boiling aldehydes present in the mixed products introduced into the fractionating tower 17 and comprising primarily acetaldehyde and propionaldehyde are fractionated out overhead under controlled conditions along with some of the water contained in the mixture. The bottoms product produced in the still 17 is conducted into a fractionating still 18, which is used primarily for the separation overhead of methyl acetone. The stills 17 and 18 are each associated with suitable condensers, as shown, and provision is made for adequate refluxing.

The bottoms product stream from the fractionating still or tower 18 and containing primarily alcohols and small proportions of ketone and aldehyde impurities is conducted into a hydroxyalkylator 19 for condensation of the ketone and aldehyde impurities into polymer products in the presence of caustic alkali or other alkaline agent. The entire mixture produced in the alkylator 19 is conducted into a flash still 20 for the removal of alcohols from the polymer and waste materials which are withdrawn from the bottom of the still 20.

The alcohols and water taken overhead from the still 20, are conducted into a fractionating tower 21 for the separation overhead of the ethanol content of the mixed alcohols. The bottoms from the ethanol still 21 are conducted into a rerun still 22 which is operated and controlled so as to take overhead primarily propanol, butanol and small proportions of higher alcohols. Water and dissolved higher alcohols are removed from the bottom of the still 22 for further processing after a sufficient accumulation.

The overhead vapors from the still 22 are conducted into a dehydrating still 23 in which a suitable azeotropic entrainer (such as benzene) is introduced and used to carry over the water from the alcohol mixture. This still is associated with a separator 24 and a water stripper 25; the overhead product from the still 23 being condensed, separated into layers and the azeotropic entrainer layer containing dissolved alcohols returned to the top of the still 23. The water layer with small proportions of water soluble constituents is conducted into the stripping still 25 which drives overhead alcohol constituents, azeotropic entrainer and water, which are returned to the separator 24, while most of the water is withdrawn from the bottom of the stripper 25.

The dehydrated alcohol stream produced by the still 23 is withdrawn as a bottoms product and conducted into a propanol still 26 from which normal propanol is recovered overhead as a substantially dry and clean fraction. The bottoms product of higher boiling point is withdrawn from the fractionating still 26 into a fractionating still 27 for the removal overhead of n-butanol. This butanol product is substantially anhydrous and a relatively clean fraction. The higher boiling alcohols are withdrawn as a bottoms product from the still 27 and may be accumulated for fractionation so as to separate the various individual higher alcohols from each other.

The bottoms products removed from the fractionating tower 5 and recovered in the separator 6, together with some of the products taken overhead, are processed in accordance with the showing in Figure 1a of the drawings. The oil fraction separated out in separator 6 of Figure 1 and removed through the line 8 is conducted into a caustic alkali treater 28 in which the oily fraction is agitated thoroughly with a caustic alkali solution which converts the organic acids into salts and hydrolyzes the esters, which then yield alcohols and salts of the acids. The acid-free oil fraction is removed overhead from the treater 28, while the caustic solution containing the salts of organic acids is withdrawn into a salt solution stripping still 29 for removal of volatile impurities which are distilled overhead. The alkaline salt solution is withdrawn from the still 29 and passed into an acidifier 30 into which sulfuric acid is introduced and used to convert the salts of organic acids into organic acids. The caustic extract separated out in the separator 12 in Figure 1 and containing salts of organic acids removed from the oil fraction processed in the caustic treater 11 is conducted through the line 13 and mixed with the salt solution introduced into the acidifier 30.

The aqueous fraction withdrawn from the separator 6 in Figure 1 and conducted therefrom through the line 7 is processed, as shown in Figure 1a, by conducting the mixture into a stripping still 31 for the removal of its small content of higher alcohols, aldehydes and ketones. These materials are vaporized overhead, condensed and collected in a separator 32 where the water insoluble higher alcohols, aldehydes and ketones separate from the water solution of organic acids which were carried overhead. The latter solution is removed from separator 32 and returned to the still 31 while the upper layer is conducted into a caustic treater 33 where the mixture is intimately contacted with 10 per cent caustic solution for washing out any organic acids which may have been dissolved in the upper layer and separated in separator 32. The mixture from the treater 33 is conducted into a salt solution stripper 34 which is operated so as to remove overhead for condensation and collection, the high molecular weight alcohols, aldehydes and ketones. This mixture is preferably introduced into the still 17 or 18 in Figure 1 for processing with materials therein. The salt solution reaching the bottom of the still 34 and containing the salts of organic acids is conducted therefrom together with the solution in the line 13 into the acidifier 30 where the acid salts are converted to organic acids.

The bottoms stream from the stripping tower 31 comprising a water solution of water soluble low molecular weight organic acids are conducted into a purification still 35. The purification still 35 is operated in a manner similar to that of the still 23, using butyl acetate to effect the azeotropic distillation and purification of the lower molecular weight acids. The azeotropic mixture of vapors taken overhead are condensed and separated in a separator 36 arranged so that the butyl acetate layer is conducted back into the still 35 while the water layer containing impurities and dissolved acids and butyl acetate, is conducted into an entrainer recovery still 37. The water and impurities removed in the purifying operation is withdrawn to waste from the bottom of the still 37, while the vapors taken overhead are condensed with the vapors from the still 35 and the condensate sent to the separator 36 and recycled to the azeotropic distillation system.

The acids are recovered as a bottoms product in the still 35 and conducted into an acid treater 38, where they are intimately contacted with concentrated sulfuric acid to remove carbonyl and other impurities. The mixture from this treater is conducted into a flash still 39 from which the purified organic acids are taken overhead into a fractionating column 40. The residue obtained in the flash still 39 is withdrawn as an acid sludge and may be sent to an acid recovery system.

The acidified mixture of organic acids and inorganic salt solution produced in the acidifier 30 is withdrawn therefrom and conducted into a flash still 41 operated under vacuum so as to carry overhead the higher molecular weight acids regenerated in the acidifier. The mineral salt solution (sodium sulfate) is withdrawn from the bottom of the flash still 41 while the condensed higher molecular weight acids are conducted into a purifying tower 42. This tower is operated in a manner similar to that of the tower 35 and butyl acetate is used to effect the azeotropic distillation and purification of the acids. The overhead vapors from the still 42 are condensed and sent to a separator 43 from which the butyl acetate layer and soluble acids taken overhead are returned to the tower 42, while the water layer containing primarily entrained butyl acetate and water soluble organic acids and impurities is conducted through a line 44 into the entrainer recovery still 37 along with the water layer from the separator 36.

The acid mixture recovered in the bottom of the still 42 is conducted into an acid treater 45 for the continuous treatment of the stream of the acids with sulfuric acid for removal of carbonyl and other impurities. The organic acids are intimately mixed with concentrated sulfuric acid in the treater 45 and conducted into a flash still 46, while the overhead vapors are condensed, under vacuum conditions and thereby separated from the sulfuric acid residue. The acid residue or sludge is withdrawn from the bottom of the still 46, while the overhead vapors are condensed, collected and the condensate passed into a stripping still 47 for the removal of lower aliphatic acids from the higher molecular weight organic acids. The lower molecular weight acids are taken overhead through a line 48 and introduced into the still 40 along with the lower molecular weight acids removed from the flash still 39. The higher molecular weight acids separated out in the still 47 are introduced into a fractional distilling tower 49.

The purified and acid-refined lower molecular weight organic acids introduced into the fractionating still 40 are processed under controlled fractionating condition to recover overhead the acetic acid content of the mixture. Propionic and butyric acids are respectively recovered in a similar manner from the acid mixture in succeeding fractionating stills 50 and 51 by the fractation of the bottoms product from the preceding fractionating still.

The bottoms product recovered in the fractionating still 51 and comprising organic acids of higher molecular weight than butyric acid are withdrawn through a line 52 and conducted into the fractionating still 49 along with the mixture of higher molecular weight acids from the stripping still 47. The mixture of organic acids introduced into the fractionating still 49 are fractionated therein under vacuum and at temperature conditions adapted to take overhead the valeric acids content of the mixture. Acids of higher boiling point are removed from the acid mixture in successive vacuum-operated fractionating columns 53, 54 and 55. Hexanoic acids are recovered overhead from the column 53, heptanoic acids from the column 54 and octanoic acids from the column 55. The organic acids of still higher boiling point remaining in the column 55 are withdrawn as a bottoms product for further treatment and fractionation when the quantity warrants such a procedure.

From the foregoing description of the process for handling the stream of processed products produced by the Synthol synthesis, it will be seen that provision is made for recovering in a substantially pure state a great number of different chemicals including alcohols, aldehydes, ketones and organic acids as well as the hydrocarbons produced by the process. The combined handling of the hydrocarbons and the oil and water soluble constituents has the particular advantage that the alcohols and acids are effectively separated in the joint distillation, the first step in the process, and are thereafter processed separately so as to avoid esterification and consequent loss of acids and alcohols. The alcohol stream is processed in such a way as to remove the acid impurities, which are taken at a particular point into the organic acid processing part of the system. The higher alcohols fractionated from the acids are removed in a particular way and processed with the alcohol stream.

It will be understood that in a process of this type the proportions of the various materials may be relatively small. For example, in the processing of a particular stream of Synthol produced products the original mixture introduced into the fractionating tower 5 contained nearly 50 per cent water, about 25 per cent hydrocarbons with the remaining portion distributed through the whole group of alcohols, aldehydes, ketones and acids referred to above. In the particular example referred to, the ethanol content amounted to about 6 per cent by weight, the propanol to 1.3 per cent and the n-butanol to about 1 per cent by weight. Acetic acid accounted for about 1.5 per cent while the original stream contained about 1 per cent each of propionic and n-butyric acids. The percentages of other materials were for the most part below 1 per cent. However, all of the percentages, if based upon the production of organic compounds, would be approximately doubled in view of the large proportion of water in the original stream. Some of the percentages may appear to be relatively low, but when it is realized that a large commercial plant produces the product stream on a continuous basis, considerable quantities of all materials will be produced. The production, for example, of n-butyric acid which was approximately 1 per cent of the original stream, counting the water, would run into a relatively large production in a full-sized commercial plant.

While benzene or butyl acetate has been referred to for use in effecting the azeotropic distillation in certain cases, it is to be understood that other selected materials may be used. For example, ethyl acetate may be used for extraction of the acids.

My improved process may be employed for the handling of mixtures of oxygenated hydrocarbons produced by other processes.

Some modifications may be made in the handling of the various streams of materials being purified and fractionated without materially changing the overall nature of the process and the various combined operations as described. Such changes are contemplated as coming within the spirit and scope of my invention as defined by the appended claims.

I claim:

1. The process of purifying a mixture of synthetically produced organic materials including hydrocarbons, oxygenated organic compounds and water, which comprises subjecting the mixture of oily and aqueous products to a joint fractional distillation to recover an overhead product comprising light hydrocarbons, water, a large percentage of the carbonyls and alcohols contained in the charge stock and a small percentage of the acids contained therein, and a bottoms product comprising heavier hydrocarbons, water, a large percentage of the acids contained in the charging stock and a small percentage of the carbonyls and alcohols contained therein, separating the bottoms product into oily and aqueous layers, subjecting the aqueous layer to a second fractional distillation, whereby to separate therefrom an overhead product containing carbonyls and alcohols, and a bottoms product containing organic acids, purifying the bottoms product by azeotropic distillation with butyl acetate, recovering partially purified organic acids as a bottoms product from the azeotropic distillation, further purifying the acids by treatment with concentrated sulfuric acid, and fractionating the resultant purified organic acids to recover their individual organic acid constituents in substantially pure form.

2. The process of purifying a mixture of synthetically produced organic materials including hydrocarbons, oxygenated organic compounds, and water, including subjecting the mixture of oily and aqueous products to a joint fractional distillation to recover an overhead product comprising light hydrocarbons, water, alcohols, and carbonyls, and a minor proportion of the acids contained in the charge stock, and a bottoms product comprising heavier hydrocarbons, water, and the major portion of the acids contained in the charge stock, separating the overhead product into an aqueous and oily layer, treating the oily layer with caustic solution to convert the acids present into their sodium salts, recovering the acid salts, separating the bottoms product into an aqueous layer and an oily layer, treating the bottoms oily layer with a caustic soda solution to convert the acids present into their respective sodium salts, recovering the acid salts, combining the acid salts from the bottoms oil layer with the acid salts from the overhead oil layer, treating the mixed salt solutions with acid to regenerate the organic acids contained therein, subjecting the aqueous layer of the bottoms product from the joint fractional distillation to a second fractional distillation to separate therefrom its content of carbonyls and alcohols, recovering a bottoms product from the second fractional distillation comprising an aqueous solution of organic acids, mixing the organic acids with the regenerated organic acids obtained from the mixed caustic solutions, and recovering substantially pure acetic, propionic, butyric, and higher acids.

3. The process of purifying a mixture of synthetically produced organic materials including hydrocarbons, oxygenated organic compounds, and water, which comprises subjecting the mixture of oily and aqueous products to a joint fractional distillation to recover an overhead product comprising light hydrocarbons, water, the major portion of the carbonyls and alcohols, and a minor proportion of the acids contained in the feed stock, and a bottoms product comprising heavier hydrocarbons, water, the major portion of the acids, and a minor portion of the carbonyls and alcohols contained in the original charging stock, separating the overhead from the joint fractional distillation into an oily layer containing dissolved organic compounds, and an aqueous layer containing alcohols and other water soluble compounds, washing the oily layer whereby to strip therefrom additional water soluble compounds, combining the aqueous layer with the wash water from the oily layer, subjecting the combined aqueous solutions to a fractional distillation to recover therefrom as an overhead product a major portion of aldehydes and ketones contained therein, and as a bottoms product an aqueous solution containing alcohols and a minor portion of the aldehydes and ketones contained therein, polymerizing the aldehydes and ketones contained in the bottoms product from the second fractional distillation, separating the resultant polymers, and subjecting the mixture of alcohols to a series of fractionations to separately recover ethanols, propanol, butanol, and higher alcohols.

4. The process as defined in claim 3 wherein the mixture of alcohols is further purified by azeotropic distillation with benzene prior to the series of fractionating operations.

IGNACE L. MALM.

REFERENCES CITED

The following references are of record in the file of this patent:

UNITED STATES PATENTS

| Number | Name | Date |
|---|---|---|
| 1,684,640 | Schmidt et al. | Sept. 18, 1928 |
| 1,704,751 | Luther et al. | Mar. 12, 1929 |
| 1,870,816 | Lewis | Aug. 9, 1932 |
| 1,912,484 | James | June 6, 1933 |
| 2,076,607 | Woodhouse | Apr. 13, 1937 |
| 2,467,966 | Clark | Apr. 19, 1949 |
| 2,476,788 | White | July 19, 1949 |
| 2,482,284 | Michel et al. | Sept. 20, 1949 |

OTHER REFERENCES

Koch et al., Brenstoff Chemie, 16, 382 to 387 (1935).

Fischer, "Conversion of Coal Into Oils," pages 242 to 245 (1925).

U. S. Naval Technical Mission in Europe, "The Synthesis of Hydrocarbons and Chemicals from CO and $H_2$," pages 84 to 92.